(12) United States Patent
Narasimhan et al.

(10) Patent No.: US 10,141,966 B2
(45) Date of Patent: Nov. 27, 2018

(54) UPDATE OF A TRUSTED NAME LIST

(71) Applicant: Apple Inc., Cupertino, CA (US)

(72) Inventors: Avinash Narasimhan, Cupertino, CA (US); Hemant Purswani, Sunnyvale, CA (US); Clark P. Mueller, San Jose, CA (US); David T. Haggerty, San Francisco, CA (US); Li Ll, Los Altos, CA (US); Arun G. Mathias, Los Altos, CA (US); Najeeb M. Abdulrahiman, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/807,516

(22) Filed: Nov. 8, 2017

(65) Prior Publication Data

US 2018/0069581 A1     Mar. 8, 2018

Related U.S. Application Data

(62) Division of application No. 15/222,759, filed on Jul. 28, 2016, now Pat. No. 9,831,903.

(51) Int. Cl.
*H04B 1/3816* (2015.01)
*H04W 4/24* (2018.01)
*H04L 12/24* (2006.01)

(52) U.S. Cl.
CPC ....... *H04B 1/3816* (2013.01); *H04L 41/0893* (2013.01); *H04W 4/24* (2013.01)

(58) Field of Classification Search
CPC .................................................. H04L 41/0893
See application file for complete search history.

(56) References Cited

U.S. PATENT DOCUMENTS

| 6,263,214 | B1 | 7/2001 | Yazaki et al. |
| 6,628,934 | B2 | 9/2003 | Rosenberg et al. |
| 6,961,567 | B1 | 11/2005 | Kuhn |
| 8,442,521 | B2 | 5/2013 | Fleischman et al. |
| 8,849,278 | B2 | 9/2014 | Bush et al. |
| 8,887,257 | B2 | 11/2014 | Haggerty et al. |

(Continued)

OTHER PUBLICATIONS

GMSA RSP Technical Specification, Official Document SGP .22 dated Jan. 13, 2016 (114 Pages).

(Continued)

*Primary Examiner* — Hsin-Chun Liao
(74) *Attorney, Agent, or Firm* — Dickinson Wright RLLP

(57) ABSTRACT

Methods, devices, and servers for as-needed update of a trusted list are provided herein. An electronic subscriber identity module (eSIM) server receives a request for an eSIM of a particular type from a wireless device. The eSIM server evaluates the particular type and requests an eSIM of the particular type from a second eSIM server, which is not initially trusted by a secure element (SE) of the wireless device. The eSIM server sends a policy update to the wireless device. The wireless device passes the policy update to the SE, for example, a universal integrated circuit card (UICC). The UICC updates the trusted list with an identity of the second eSIM server. When the wireless device downloads a bound profile package (BPP) containing an eSIM from the second eSIM server, the UICC validates the BPP based on the updated trusted list. The eSIM is then installed on the UICC.

20 Claims, 11 Drawing Sheets

(56) References Cited

U.S. PATENT DOCUMENTS

| | | |
|---|---|---|
| 2005/0079863 A1 | 4/2005 | Macaluso |
| 2006/0035631 A1 | 2/2006 | White et al. |
| 2009/0181662 A1 | 7/2009 | Fleischman et al. |
| 2011/0075608 A1 | 3/2011 | Chai et al. |
| 2012/0260090 A1 | 10/2012 | Hauck et al. |
| 2013/0303122 A1 | 11/2013 | Li et al. |
| 2014/0143826 A1 | 5/2014 | Sharp et al. |
| 2014/0349634 A1 | 11/2014 | Kukuchka et al. |
| 2015/0161592 A1* | 6/2015 | Park .................... G06Q 20/341 705/41 |
| 2015/0334111 A1 | 11/2015 | Ziat |
| 2016/0182737 A1* | 6/2016 | Suzuki ................. H04M 15/83 455/408 |
| 2016/0269891 A1* | 9/2016 | Chen ..................... H04W 76/18 |
| 2016/0366137 A1 | 12/2016 | Borgards et al. |

OTHER PUBLICATIONS

Patent Application No. 151222,759—Notice of Allowance dated Jul. 19, 2017.

* cited by examiner

CHOOSE A DATA PLAN FROM A CARRIER ASSOCIATED WITH AN (INITIALLY) UNTRUSTED eSIM SERVER.
201

RECEIVE A POLICY UPDATE TO ADD THE eSIM SERVER TO A TRUSTED LIST.
202

DOWNLOAD AN eSIM CORRESPONDING TO THE DATA PLAN FROM THE eSIM SERVER.
203

UPDATE OF A TRUSTED NAME LIST

CROSS-REFERENCE TO RELATED APPLICATIONS

This application is a divisional of U.S. application Ser. No. 15/222,759, filed Jul. 28, 2016, entitled "UPDATE OF A TRUSTED NAME LIST," the contents of which are hereby incorporated by reference.

FIELD

The described embodiments relate to updating a trusted list in a secure element (SE).

BACKGROUND

A wireless device can be provisioned with an electronic subscriber identity module (eSIM). Various network entities participate in provisioning of an eSIM to an SE, where the SE is present in a wireless device. To establish trust between communicating entities, public key infrastructure (PKI) techniques can be used. Problems can arise if a SE does not trust one of these entities.

Aspects of eSIM provisioning include the downloading, installing, enabling, disabling, switching and deleting of a profile on an eUICC or universal integrated circuit card (UICC). UICCs and eUICCs are secure elements (SEs) for hosting profiles. A profile is a combination of operator data and applications provisioned on an SE in a device for the purposes of providing services by an operator. A profile can contain one or more secure data used to prove identity and thus verify contract rights to services. During assembly of a device, the SE can be inserted into the device. A UICC may identified by a card serial number (CSN), and an eUICC may be identified by an eUICC identifier (EID). This application will generally refer to a UICC; the same techniques and apparatuses are applicable for an eUICC.

A profile can be identified by a unique number called an ICCID (Integrated Circuit Card Identifier). A wireless operator is a company providing wireless cellular network services. A mobile network operator (MNO) is an entity providing access capability and communication services to its subscribers through a mobile network infrastructure. In some cases, the device is user equipment used in conjunction with a UICC to connect to a mobile network. An end user or customer is a person using a device. An enabled profile can include files and/or applications which are selectable over an UICC-device interface. An architecture framework related to remote provisioning and management of secure elements in devices is outlined in GSM Association document GSMA SGP.22: "RSP Technical Specification," Version 1.0 Jan. 13, 2016 (hereinafter "SGP.22").

A digital signature is authentication data that binds the identity of the signer to a data part of a signed message. A certificate issuer (CI) is a trusted third party whose signature on a certificate vouches for the authenticity of the public key of the associated user identity. A public-key certificate may also be referred to herein simply as a certificate. A user may store a copy of a certificate, where the certificate holds the name of a given party (user identity). The public key recorded in the certificate can be used to check the signature on a message signed using a PKI private key of the given party. Further details with regard to PKI techniques in eSIM provisioning can be found in SGP.22.

SUMMARY

Representative embodiments set forth herein disclose various systems and techniques for updating a trusted in list in a UICC when an eSIM is to be provisioned to the UICC from a server that is initially untrusted.

Provisioning UICCs in a broadcast fashion with certificates and/or names of servers worthy of trust is neither an efficient use of UICC memory nor an efficient use of network bandwidth. Also, trust has a time-dependent aspect. Universal provisioning of trusted name lists is sensitive to entries of a given trusted name list becoming out-of-date. Embodiments provided herein update a trusted name list, also referred to as a trusted list, in a particular UICC associated with a need at a particular time for secure communication with a given eSIM server. An eSIM server may be referred to herein as, for example, an eSIM delivery server, as an SM-DP server, or as an SM-DP+ server.

A UICC in a device includes a trusted list of servers. In some embodiments, this list identifies trusted servers by their names, thus the expression trusted name list. The UICC possesses a PKI certificate of a trusted root server. The UICC trusts communications signed with the corresponding private key of the root server. The signature of any communications from the root server is verified by the UICC using the public key of the root server, found in a PKI certificate of the root server.

A common name of a given server authenticated by the root server is bound to a public key of the given server by a signature operation of the root server using the root server private key corresponding to the root server public key. The UICC thus also trusts communications from the given server because it recognizes the common name based on the root server signature operation. The identities of servers trusted by the UICC are stored in the trusted list of servers in the UICC.

In some embodiments, a user of a device chooses a carrier data plan of a selected carrier associated with eSIMs supplied by a third party eSIM server. A trusted list in the UICC does not include the common name or other identifier of the third party eSIM server. In some instances, the UICC possesses a certificate of the third party eSIM server but does not trust a CA that signed that certificate. After the user makes the selection, the device sends a data plan identifier to a carrier server associated with the carrier data plan. The carrier server sends a request for an eSIM to an eSIM server, for example, a host server hosted by a mobile device manufacturer. The host server may also be referred to herein as an original equipment manufacturer (OEM) eSIM server.

In response to the request from the carrier server, the host eSIM server recognizes that a policy update should be performed to ensure that the UICC has the third party eSIM server on its trusted list. The host eSIM server prepares a policy update notification. When the device next checks for policy updates, it will pull the policy update notification from the host eSIM server and pass the policy update notification on to a policy control function (PCF) in the UICC. The UICC will verify that the policy update notification is from a trusted source (the host eSIM server) and will then update its trusted list to include the common name of the third party eSIM server. At this, or a later time, the UICC may obtain a PKI certificate of the third party eSIM server.

The host eSIM server, in an exemplary embodiment, coordinates operations of the third party eSIM server and the carrier server to enable the deployment of the eSIM to the device. For example, upon receiving the request for an eSIM from the carrier server, the host eSIM server sends a request to the third party eSIM server. This causes the third party eSIM server to reserve an eSIM for the UICC and to bind the reserved eSIM to create a bound profile package (BPP).

Binding is done by encrypting an eSIM based on the targeted UICC that the eSIM is to be delivered to. Only the targeted UICC is able to decrypt the BPP and recover the eSIM in decrypted form.

The carrier server confirms to the device that the carrier plan is now activated. Activation, in some embodiments, includes updating a home location register (HLR) database to recognize the eSIM identifier and associate it with an identifier of the device, such as an international mobile equipment identifier (IMEI). After receiving the plan activation confirmation, the device commences operations to download the eSIM. The device sends a policy update query to the host eSIM server. In response, the host eSIM server provides a new list of trusted servers or additions to the list of trusted servers. The device passes on the new list of trusted servers to the UICC. The UICC updates its trusted server list using the new list of trusted servers sent by the host eSIM server. The UICC then, in some embodiments, confirms to the device that the trusted server list has been updated.

Continuing with the operations to the download the eSIM, the device sends a request for pending eSIMs to the host eSIM server. This request, in some embodiments, identifies the UICC using an ICCID or an EID. Because the eSIM is reserved at the third party eSIM server, the host eSIM server responds with a message redirecting the device to the third party eSIM server. For example, the host eSIM server, in some embodiments, sends a name or network address of the third party eSIM server to the device. The device responds to the redirection message by sending a message to the third party eSIM server requesting any reserved eSIMs. Because the device has received a redirection message, it also sends an inquiry to the UICC to confirm that the third party eSIM server is trusted. Based on the updated trusted list, the UICC confirms that the third party eSIM server is trusted. The device receives a data blob including the BPP. The device and the UICC perform installation of the eSIM in the UICC from the data blob.

The device, with the aid of authentication and encryption operations performed by the UICC including the use of over-the-air (OTA) keys comprised in the eSIM, is now able to communicate with the selected carrier using the selected carrier data plan and provide wireless servers to the user of the device.

In some embodiments, the device comprises a processor and a memory coupled to the processor. The memory comprises instructions that when executed by the processor cause the device to perform a number of steps. The steps can include: i) sending a plan identifier to a carrier billing server, ii) receiving a plan confirmation from the carrier billing server, iii) requesting, responsive to receiving the plan confirmation, a policy update from a first eSIM server, iv) receiving the policy update from the first eSIM server, wherein the policy update comprises an identification of a second eSIM server, v) sending the policy update to a universal integrated circuit card (UICC) of the device for update of a trusted list, vi) sending a first request to the second eSIM server, wherein the first request is directed to a pending eSIM, vii) receiving a data binary large object (blob) from the second eSIM server, wherein the data blob comprises: i) the eSIM in encrypted form, and ii) a signature of the second eSIM server, viii) sending a first portion of the data blob to the UICC for verification of the signature of the second eSIM server, and ix) providing a profile installation command to the UICC, wherein the profile installation command refers to the eSIM. In some embodiments, the pending eSIM in encrypted form is bound to the UICC. In some embodiments, the UICC is identified by a card serial number (CSN). In some embodiments: i) the UICC is an embedded UICC (eUICC), and ii) the eUICC is identified by an eUICC-ID (EID).

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing calls and other communications between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Figure 1:
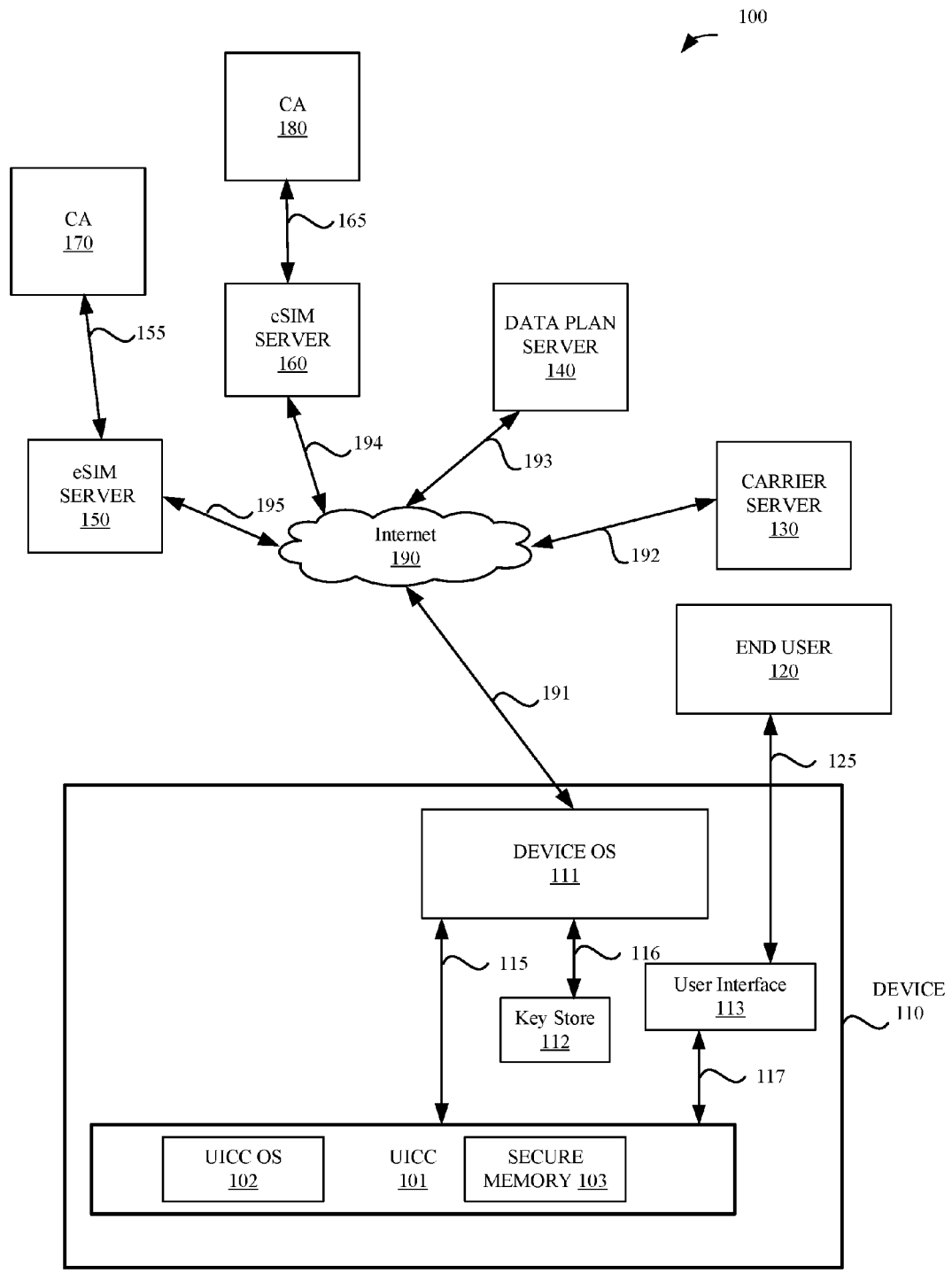
FIG. 1 illustrates an exemplary system for updating a trusted list in a UICC in an on-demand fashion, according to some embodiments.

Representative applications of apparatuses, systems, and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

A wireless device can be provisioned with an eSIM. Various network entities participate in provisioning of an eSIM to an SE (e.g., a UICC or an eUICC), where the SE is associated with a wireless device. To establish trust between communicating entities, PKI techniques can be used. Problems can arise if an eSIM is reserved for a UICC by a particular eSIM server, but a trusted list of the UICC does not initially identify the particular eSIM server.

Embodiments disclosed herein avoid these problems by updating a trusted list on an as-needed basis or, in other words, on an on-demand basis. If an eSIM is requested, via a device on which a UICC is present, from a server that may not be trusted by the UICC, the trusted list is updated to allow provisioning of the UICC with the requested eSIM. Before describing the methods, servers, and devices involved with this solution, eSIM provisioning and PKI techniques will be described to aid in the subsequent discussion.

eSIM Provisioning

A function which provides profile packages is known as a subscription manager data preparation (SM-DP, or SM-DP+). An SM-DP may also be referred to as a profile provider, an eSIM server, an eSIM delivery server, or as an eSIM vendor. An eSIM is an electronic SIM. A physical SIM can be an electronic card, which can be inserted into a wireless device. An eSIM is an example of a profile. A profile package can be a personalized profile using an interoperable description format that is transmitted to a UICC as the basis for loading and installing a profile. Profile data which is unique to a subscriber, e.g., a phone number or an International Mobile Subscriber Identity (IMSI), are examples of personalization data. The SM-DP communicates over an interface with a UICC. Certificates used for authentication and confidentiality purposes can be generated by a trusted certificate issuer.

UICC (SE) Description

Some aspects of an SE will be described here with respect to a UICC. A UICC includes an operating system, and the operating system can include ability to provide authentication algorithms to network access applications associated with a given operator. The operating system also can include the ability to translate profile package data into an installed profile using a specific internal format of the UICC. In some embodiments, the UICC is an embedded UICC (eUICC). An ISD-P (issuer security domain-profile) can host a unique profile within a UICC. The ISD-P is a secure container or security domain for the hosting of the profile. The ISD-P is used for profile download and installation based on a received bound profile package. A bound profile package is a profile package which has been encrypted for a target UICC. An ISD-R (issuer security domain-root) is a function in a eUICC responsible for the creation of new ISD-Ps on the UICC. An ECASD (embedded UICC controlling authority security domain) provides secure storage of credentials required to support the security domains on a UICC. A controlling authority security domain (CASD) may also be referred to as a "key store" herein. A security domain within the UICC contains the operator's over the air (OTA) keys and provides a secure OTA channel. OTA keys are credentials used by an operator for remote management of operator profiles on a UICC.

Some activities related to a UICC resident in a device may be performed by the device. Examples of such activities are profile download assistance and local user interface functions. More information on profile download assistance and local user interface functions can be found in SGP.22.

Public Key Infrastructure Techniques

Communications of a UICC may be authenticated using PKI techniques. The techniques disclosed herein are applicable to eUICCs, UICCs, and SEs. Certificates used for authentication and confidentiality purposes can be generated by a trusted certificate issuer (CI or root CA). A public-key certificate may also be referred to herein simply as a certificate.

A user may store a copy of a certificate, where the certificate holds the name of a given party (user identity). The public key recorded in the certificate can be used to check the signature on a message signed using a PKI private key of the given party. A user or message recipient may use an on-line protocol such as on-line certificate status protocol (OCSP) to determine if a certificate is valid.

The UICC operating system can include ability to provide authentication algorithms to network access applications associated with a given operator. The operating system also can include the ability to translate profile package data into an installed profile using a specific internal format of the UICC. An ECASD provides secure storage of credentials required to support the security domains on the UICC. A controlling authority security domain (CASD) may also be referred to as a "key store" herein.

System

FIG. 1 illustrates a system 100 in which an end user 120, in communication with a data plan server 140 via the Internet 190, selects a carrier data plan from a particular cellular carrier using a device 110. After selection of the carrier data plan, the carrier server 130, in some embodiments, sends a message to eSIM server 150 requesting that an eSIM be reserved corresponding to the selected carrier data plan. A UICC 101 is associated with, and is within, the device 110. In some embodiments, the UICC 101 is an embedded UICC (eUICC). In some instances, the particular cellular carrier uses an eSIM server 160 that is not indicated as trusted by a trusted list in the UICC 101. Embodiments described with respect to one or more entities shown in FIG. 1 update a trusted list in the UICC 101. Provisioning of an eSIM in the UICC 101 corresponding to the selected carrier data plan then proceeds.

In some embodiments, the device 110 is a portable wireless device such as a smart phone or a tablet. The device 110 includes a device operating system (OS) 111, a key store 112, and a user interface 113. The UICC includes a UICC OS 102 and a secure memory 103. The device OS 111 communicates with the UICC 101 via an interface 115 and with the key store 112 via an interface 116. The user interface is coupled to the UICC 101 by an interface 117 and with an end user 120 by an interface 125.

The eSIM server 150 is associated with a certificate authority (CA) 170. System 100 also includes an eSIM server 160, which may be a third-party eSIM server. The eSIM server 160 may distribute a PKI certificate signed by the CA 180. In some instances, the UICC 101 does not recognize the public key of CA 180 or of eSIM server 160. That is, in some instances, CA 180 and eSIM server 160 are not initially represented on the trusted list of UICC 101.

FIG. 1 is a system diagram; some aspects are represented in schematic form. Connections to the Internet are represented as 191, 192, 193, 194, and 195 for the device 110, the carrier server 130, the data plan server 140, the eSIM server 160, and the eSIM server 150, respectively. CA 170 and CA 180 also have access (not shown) to Internet 190. CA 170 communicates with the eSIM server 150 using an interface 155 and CA 180 communicates with the eSIM server 160 by an interface 165.

The carrier server 130, in some embodiments, is hosted by SoftBank Group Corp. The eSIM server 150, in some embodiments, is hosted by the manufacturer of the device 110. Examples of the eSIM server 160 are servers hosted by Oberthur Technologies, Giesecke and Devrient ("G&D") or Gemalto N.V. Examples of carriers are AT&T, T-Mobile, and Sprint.

Trusted List Logic

Figure 2:
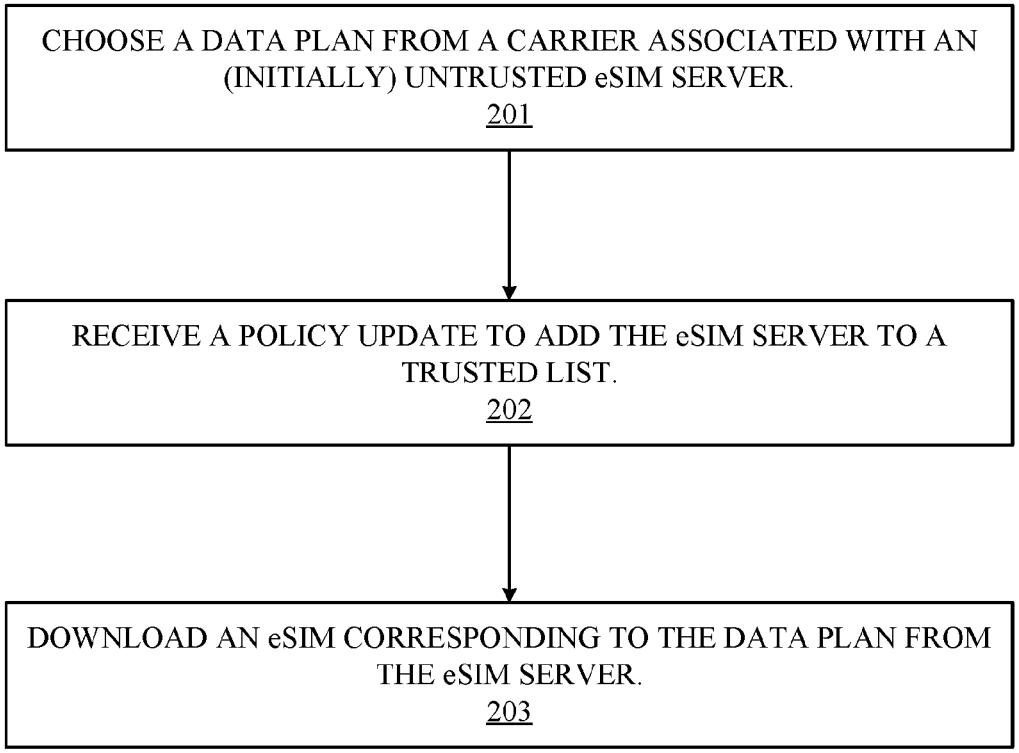
FIG. 2 illustrates exemplary logic for updating a trusted list in a UICC in an on-demand fashion, according to some embodiments.

FIG. 2 illustrates logic 200 for updating a trusted list on an on-demand basis. At 201, a user of a device housing a UICC chooses a data plan from a carrier. The carrier uses, in some instances, an eSIM server not represented, at the time of the user selection, in a trusted list of the UICC. At 202, the device receives a policy update indicating that the eSIM server is to be added to the trusted list in the UICC. The trusted list is updated accordingly. At 203, the device downloads an eSIM corresponding to the chosen data plan from the eSIM server. Based on the updated trusted list, the UICC is able to authenticate the cryptographic signature of the eSIM server. The UICC then permits the download and provisioning of the UICC with the eSIM corresponding to the chosen data plan to be completed.

Use of Trusted List

Figure 3:
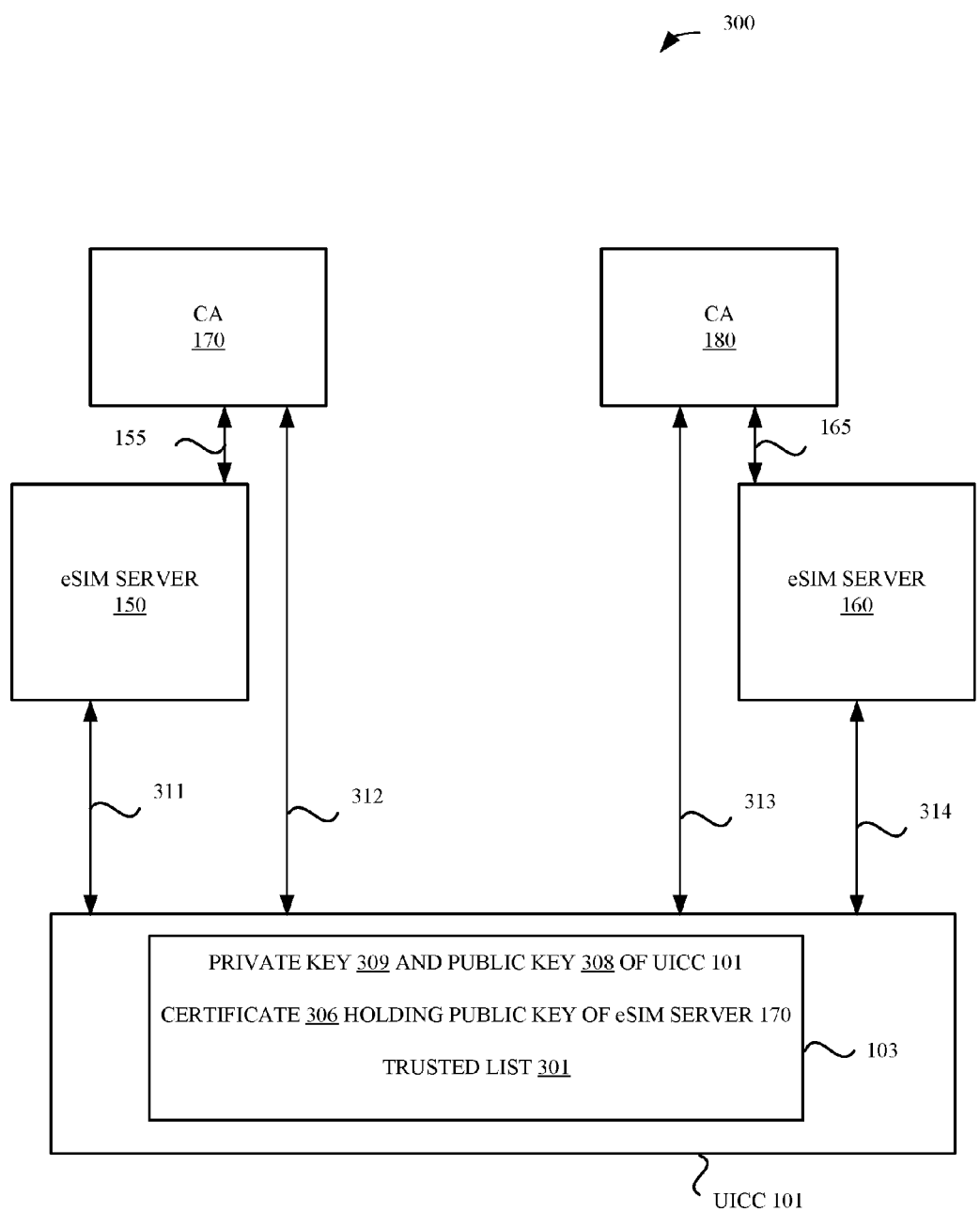
FIG. 3 illustrates exemplary details of a UICC comprising a trusted list and in communication with eSIM servers, according to some embodiments.

FIG. 3 illustrates a view 300 of portions of the system 100. UICC 101 communicates with the eSIM server 150 via an interface 311 and the eSIM server 160 via an interface 314. Communication by the UICC 101 is via the device 110 (not shown in FIG. 3, see FIGS. 1, 9, and 10). Secure memory 103 of the UICC 101 holds a copy of the PKI certificate 306 of the CA 170. In some instances, the CA 170 and the eSIM server 150 are the same server. The UICC 101 trusts CA 170. Thus, CA 170, in some embodiments, is identified by a name, public key from the certificate 306, object identifier (OID), common name, or other identifier in a trusted list 301 in the secure memory 103. Secure memory 103 also holds the PKI public key—private key pair of the UICC 101, in particular, public key 308—private key 309 of UICC 101. UICC 101 cryptographically signs messages, in some embodiments, using the private key 309. Other parties, such as the eSIM server 150, are able to authenticate those messages using the public key 308.

The UICC 101 uses the trusted list 301 to keep track of servers that it can trust. If the UICC 101 receives a communication from a server with a given name, and the given name does not correspond to any entry on the trusted list 301, then the UICC 101 will ignore that communication. For example, if a malicious server sends a provisioning command to the UICC 101, the UICC 101 will not execute the provisioning command because the malicious server is not represented in the trusted list 301. The entries on the trusted list 301, in some embodiments, include common names of servers. A common name is a value that, in some instances, appears in a PKI certificate, such as an X.509 certificate. X.509 is an International Telecommunication Union (ITU) PKI certificate standard. The common name value can be used to identify the subject of the certificate. Another identifier is a distinguished name, which is a fully-qualified domain name of the server that the certificate is for. An object identifier (OID) listed with a registration entity may be used to identify a server. Other names appearing in the trusted list 301 may be associated with the Global Platform (GP) family of standards.

Tables 1 and 2 provide examples of trusted list 301 in the UICC 101 before and after addition of the eSIM server 160 to the trusted list 301. In Table 2, a common name (CN) of the eSIM server 160 has been added to the trusted list. In this example, the eSIM server 160 is hosted by G&D and the common name of the eSIM server 160 is GD L3.

TABLE 1

Trusted List 301, Initial State

| Row | Server Name | Example Common Name (CN) |
| --- | --- | --- |
| 1 | Certificate Issuer (CI) | Apple Profile Root |
| 2 | Common name of CA 170 | Apple L3 |
| 3 | Common name of eSIM server 150 | Apple L3 |

TABLE 2

Trusted List 301, After Receiving a Policy Update

| Row | Server Name | Example Common Name (CN) |
| --- | --- | --- |
| 1 | Certificate Issuer (CI) | Apple Profile Root |
| 2 | Common name of CA 170 | Apple L3 |
| 3 | Common name of eSIM server 150 | Apple L3 |
| 4 | Common name of eSIM server 160 | GD L3 |

The UICC 101, in some embodiments, also maintains an untrusted list. An untrusted list can represent a list of entities, servers, CAs, or CIs, for example, which the UICC 101 does not trust. For example, presence of an entity identity or user identity on the untrusted list can indicate to the UICC 101 that there is no unexpired or unrevoked certificate for that entity stored in the UICC 101.

UICC 101, in some embodiments, updates trusted list 301 and, if maintained, the untrusted list, based on events. For example, a given entity identified on the untrusted list may become a trusted entity if a trusted third party, such as a CI or a CA trusted by the UICC 101, provides a signed certificate for the given entity.

Message Flow Overview

Figure 4:
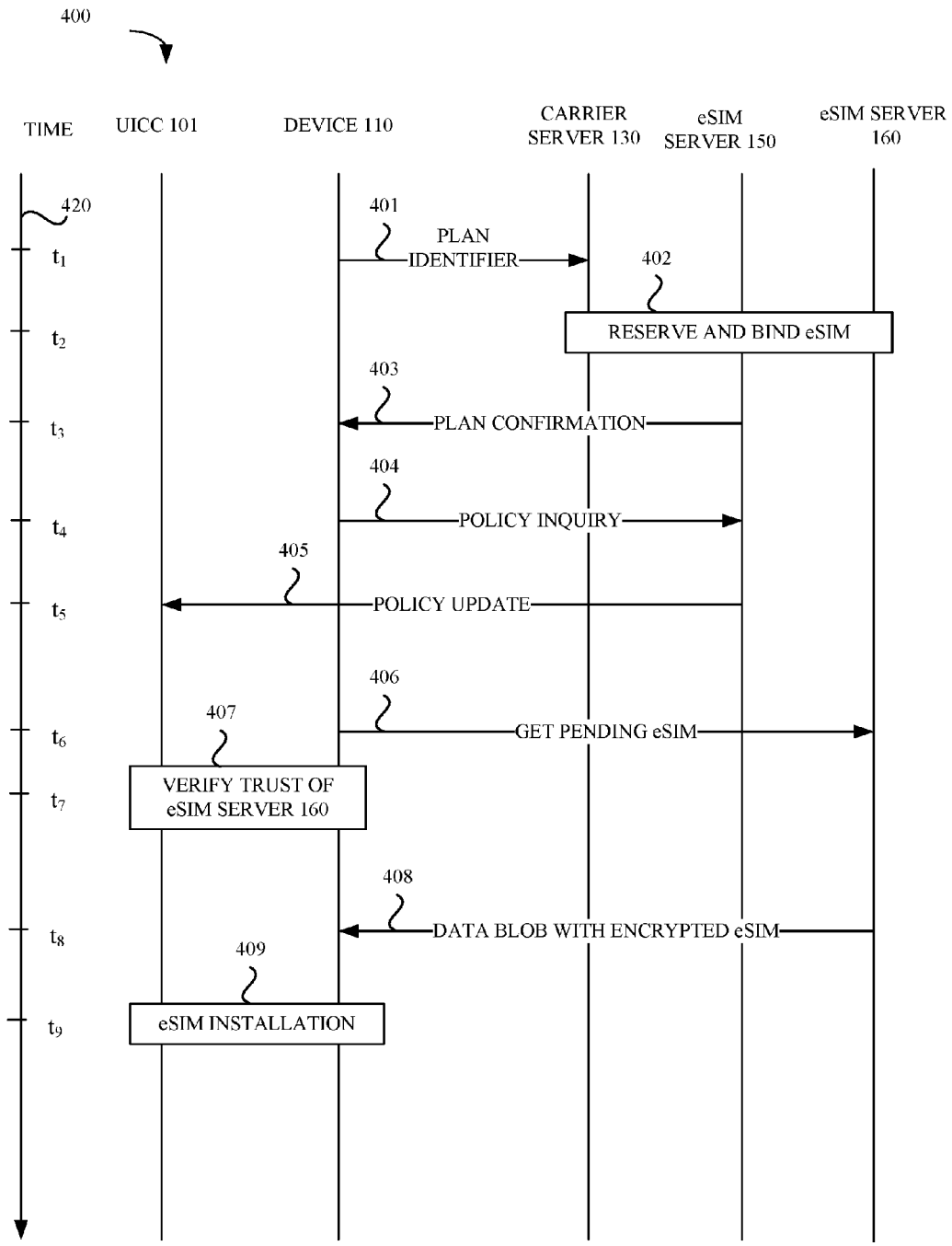
FIG. 4 illustrates an exemplary message flow for selecting a carrier data plan, reserving an eSIM with an eSIM server for the data plan, and updating a trusted list to identify the eSIM server, according to some embodiments.

FIG. 4 is an exemplary message flow diagram showing some messages and activities associated with updating a trusted list subsequent to a user selecting a carrier data plan. Additional details are provided in FIG. 8. Entities are indicated across the top of FIG. 4, and time advances from top to bottom as indicated on a time axis 420. At a time $t_1$, the end user 120 selects a carrier data plan and a plan identifier is sent in a message 401 from the device 110 to the carrier server 130. A "Reserve and Bind eSIM" event 402 then occurs around the time $t_2$ involving: i) the carrier server 130 sends an instruction to the eSIM server 150 asking that an eSIM be reserved, ii) the eSIM server 150 determines that the selected carrier uses eSIM server 160 for distribution of eSIMs, iii) the eSIM server 150 forwards the eSIM reservation request to the eSIM server 160, iv) the eSIM server 160 reserves an eSIM with an identifier value ICCID-value, v) the carrier server 130 activates service for ICCID-value in carrier billing systems, vi) the carrier server 130 issues a bind command based on the pairing of ICCID-value with an identifier of the UICC (for example, a CSN or an EID value), vii) the eSIM server 150 forwards the bind command to the eSIM server 160, viii) the eSIM server 160 performs the bind operation to create a BPP and stores the BPP until such time as the device 110 sends a request to download the BPP, and ix) the eSIM server 150 sends a bind confirmation message to the carrier server 130 confirming that the ICCID-value is bound to UICC 101.

Also near the time $t_2$, the eSIM server 150 determines whether the UICC 101 trusts the eSIM server 160. If not, the eSIM server 150 recognizes that a policy update should be performed for the UICC 101 so that the UICC 101 will trust the eSIM server 160 when the BPP is downloaded from the eSIM server 160 to the device 110 housing the UICC 101.

After receiving the bind confirmation message, the carrier server 130 sends a plan confirmation in message 403 at time $t_3$ to the device 110. The device 110 then recognizes that a profile download should be performed. The device 110 sends a policy inquiry in a message 404 at time $t_4$ to get policy updates. At a time $t_5$, policy updates are delivered in a message 405 to the UICC 101 via the device 110. The policy update includes a list of server identifiers; the list identifies one or more trusted servers that the UICC 101 is to add to the trusted list 301. Upon receiving the message 405, the UICC 101 updates the trusted list 301; the trusted list 301 now includes an identifier of the eSIM server 160; for an example updated list, see Table 2. At a time $t_6$, the device 110 continues with the profile download. Initially a message is sent (see FIG. 8) to the eSIM server 150 requesting pending eSIMs, and the eSIM server 150 replies to the device 110 with information that the message should be redirected to the eSIM server 160. The device 110 then sends, based on the redirection information, a message 406 requesting that pending eSIMs be delivered. The redirection can be based on a name or address of the eSIM server 160. Based on the redirection, the device 110 confirms with the UICC 101 whether the eSIM server 160 is trusted; see the event 407 at time $t_7$: "Verify Trust of Server 160." Based on the updated trust list 301, the UICC 101 confirms to the device 110 that eSIM server 160 is trusted.

At a time $t_8$, the eSIM server 160 sends a data blob include the BPP containing the eSIM with identifier ICCID-value. The eSIM is in encrypted form. At a time $t_9$, the device 110 and UICC 101 perform event 409, "eSIM Installation," including verification of the signature of the eSIM server 160 by the UICC 101. The UICC 101 proceeds to the signature verification because the trusted list 301 includes an identifier of the eSIM server 160. After the eSIM installation, the end user 120 begins using device 110 with the new carrier plan, supported by UICC 101.

Host eSIM Server Logic

Figure 5:
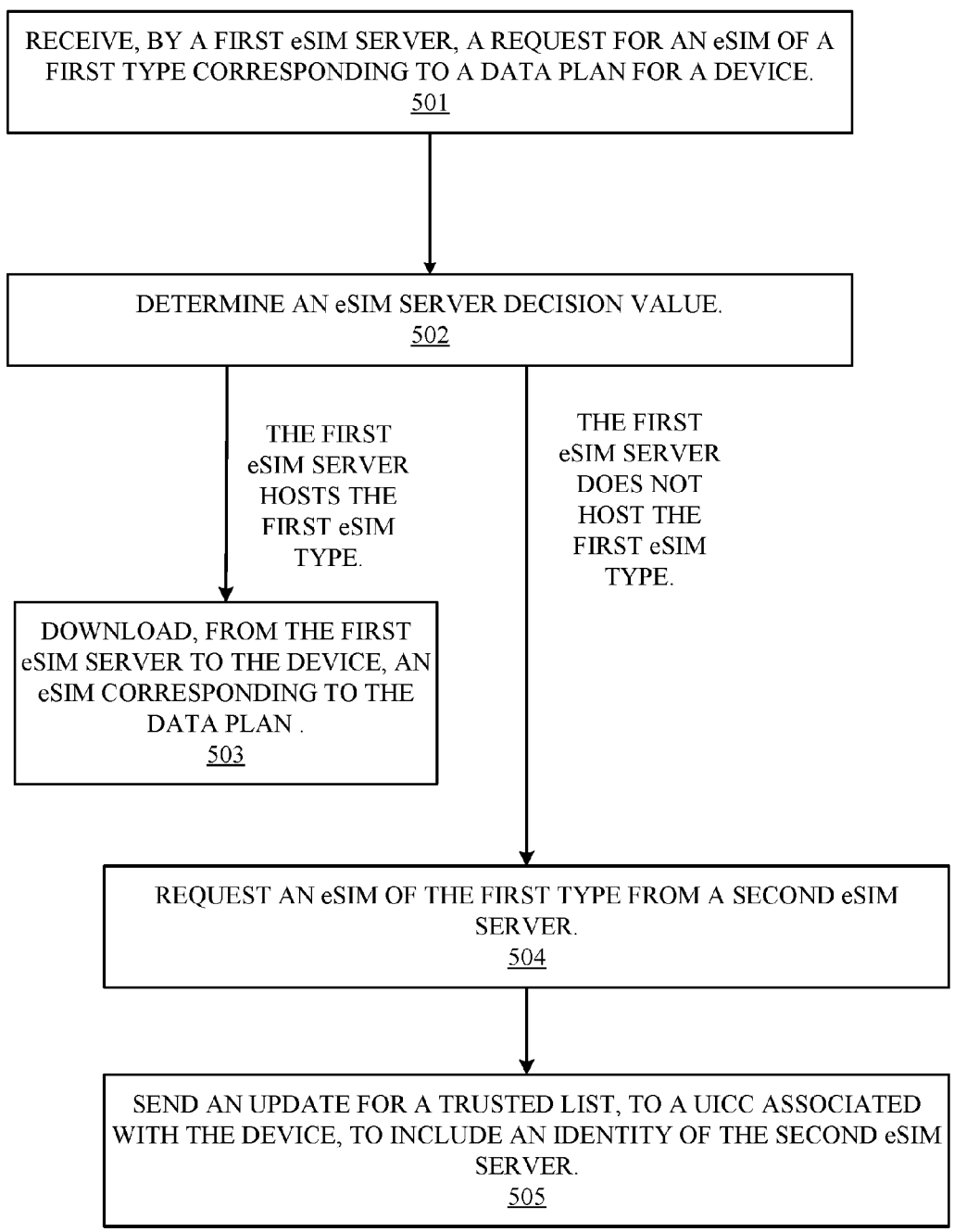
FIG. 5 illustrates exemplary logic of a host eSIM server processing a request for an eSIM, according to some embodiments.

FIG. 5 illustrates exemplary host eSIM server logic 500. At 501, an eSIM server that provides some eSIM types but not some other eSIM types receives a request for an eSIM of a first type from a device. At 502, the first eSIM server determines an eSIM server decision value. If the eSIM server decision value indicates that the first eSIM server hosts the first type of eSIM, then the logic flows to 503. At 503, the first eSIM server downloads an eSIM of the first type to the device. If the decision value indicates that the first eSIM server does not host the first type of eSIM, then the logic flows from 502 to 504. At 504, the first eSIM server requests that an eSIM of the first type be reserved by a second eSIM server. At 505, the first eSIM server sends a policy update message to a UICC associated with the device; the policy update directs the UICC to update a trusted list to include an identity of the second eSIM server.

Device Logic

Figure 6:
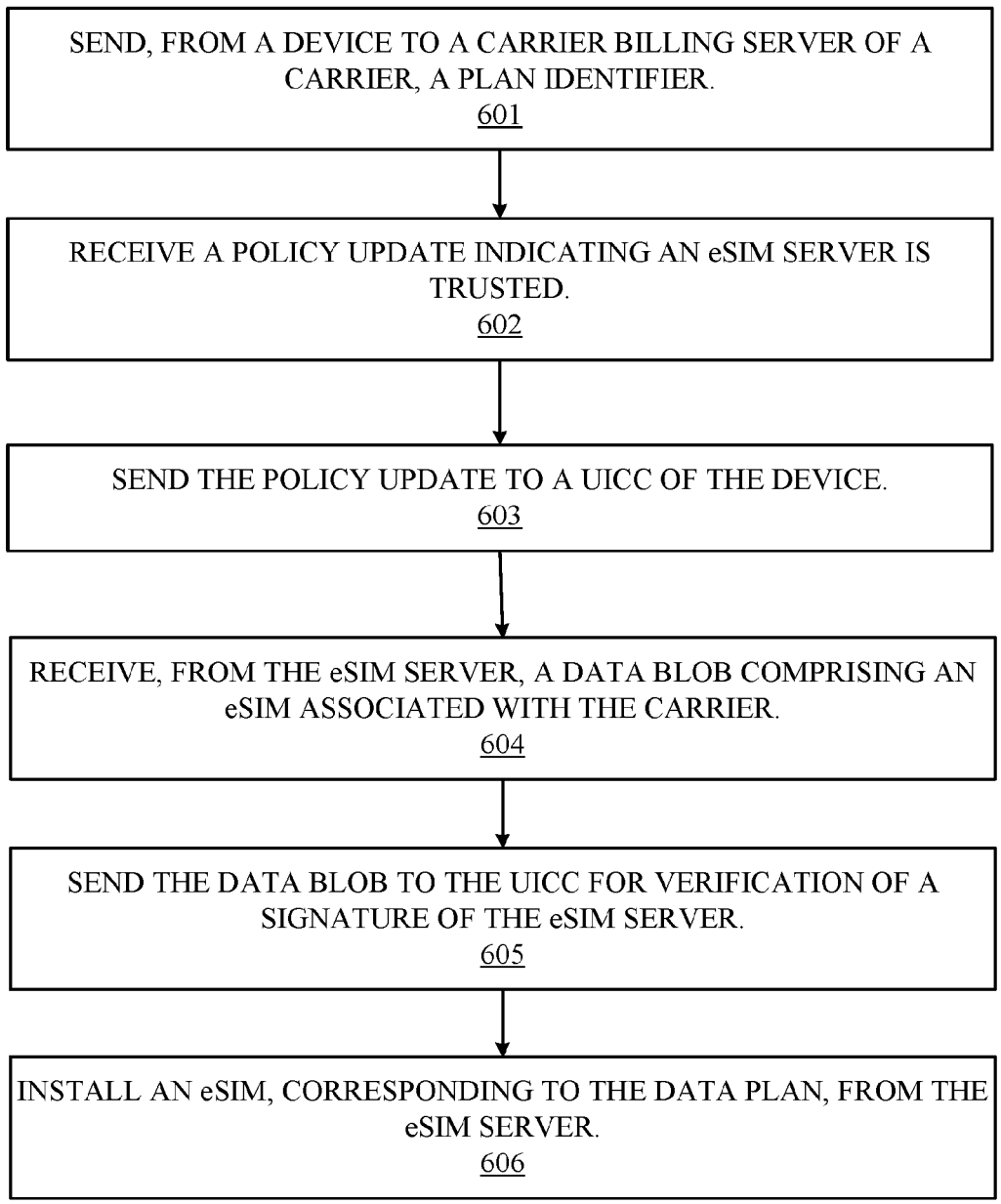
FIG. 6 illustrates exemplary logic of a device selecting a data plan, receiving a trusted list update indicating an eSIM server, and downloading the eSIM from the eSIM server, according to some embodiments.

FIG. 6 provides exemplary logic 600 for a device to request a data plan from a carrier, update a trusted list based an eSIM needed for the requested data plan, and download the eSIM. At 601, the device sends a plan identifier to a carrier billing server. At 602, the device receives a policy update indicating that an eSIM server is to be trusted. At 603, the device sends the policy update to the UICC of the device. At 604, the device receives a data blob including a bound profile package (BPP). The BPP contains an encrypted eSIM associated with the carrier and the data plan. At 605, the device sends the data blob, or a portion of it, to the UICC to authenticate the PKI signature of the eSIM server. This authentication succeeds because the eSIM server is now on the trusted list in the UICC. At 606, the device installs the eSIM on the UICC.

UICC Logic

Figure 7:
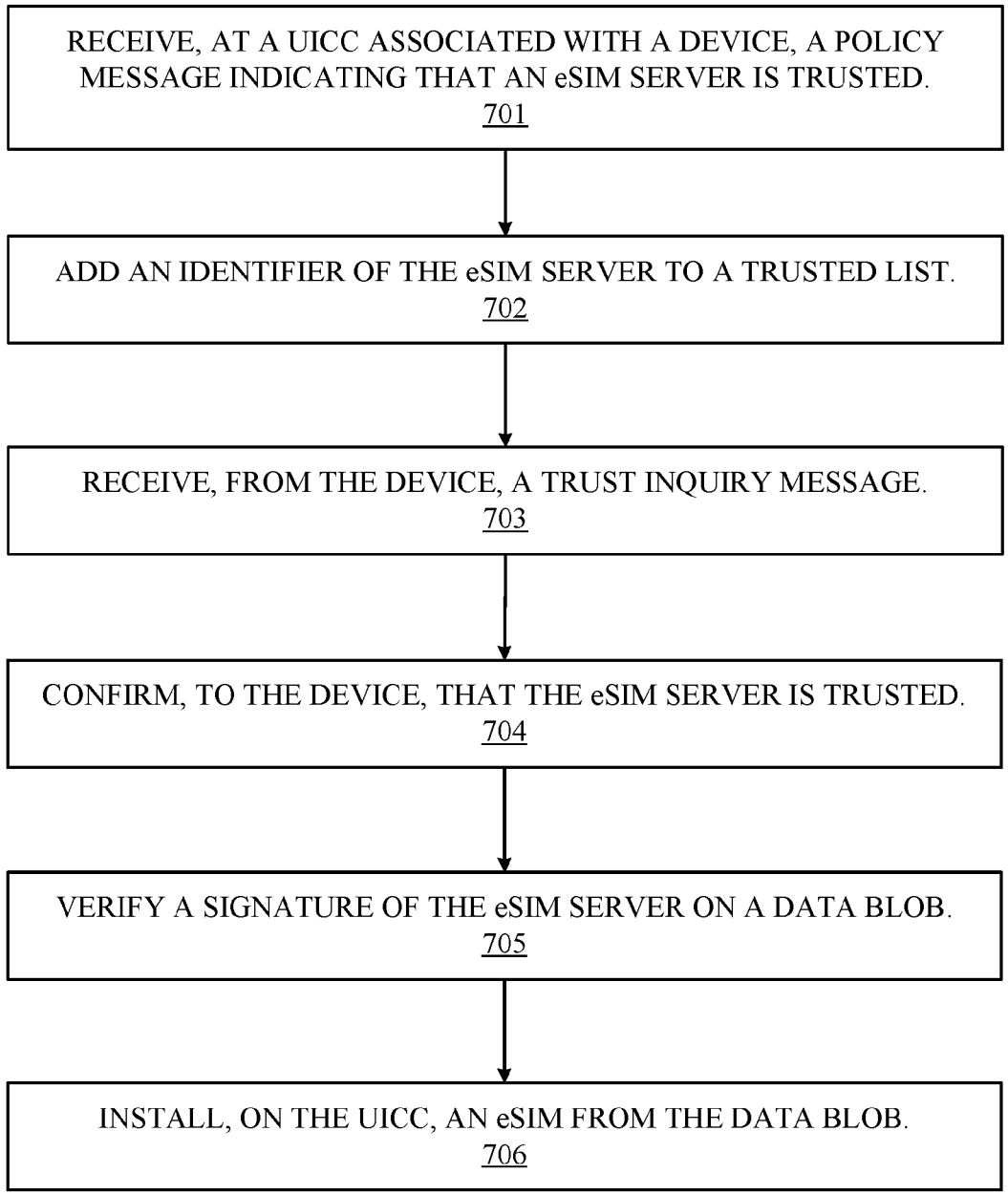
FIG. 7 illustrates exemplary logic of a UICC receiving a trusted list update indicating an eSIM server, verifying a signature on a bound profile package or data blob from the eSIM server, and installing the eSIM from the eSIM server on the UICC, according to some embodiments.

FIG. 7 provides exemplary logic 700 for a UICC to receive an on-demand update to a trusted list and install an eSIM from a server identified on the updated trusted list. At 701, the UICC receives a policy message indicating that an eSIM server is to be trusted. At 702, the UICC adds an identifier of the eSIM server to a trusted list. At 703, the UICC receives, from the device, a trust inquiry message providing an identifier of the eSIM server. The UICC finds the eSIM server identifier on the trusted list, and at 704, confirms to the device that the eSIM server is trusted. At 705, the UICC verifies the signature of the eSIM server on a data blob received at the UICC from the eSIM server via the device. At 706, the UICC installs the eSIM from the data blob in the memory of the UICC.

Detailed Message Flow

Figure 8:
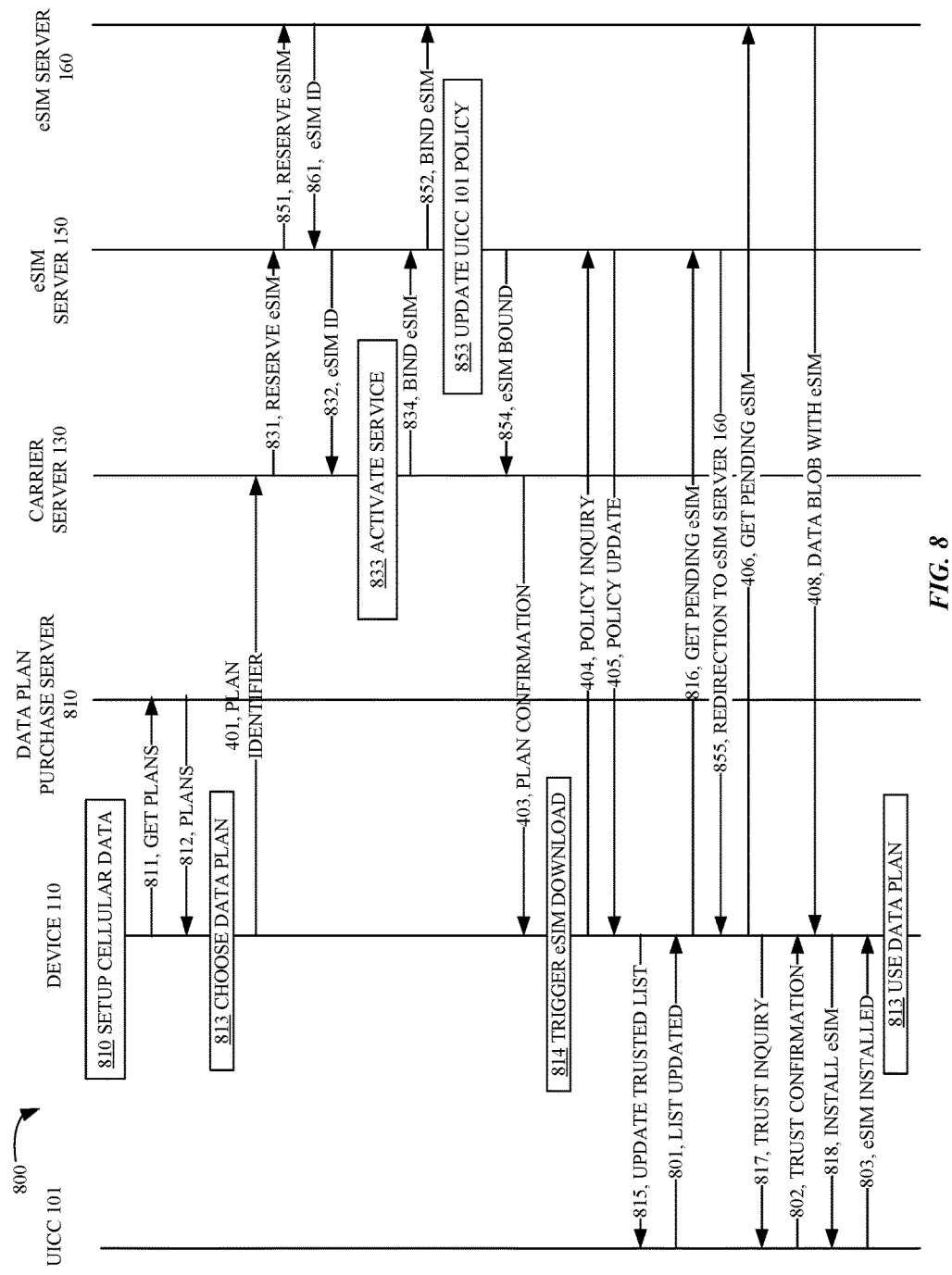
FIG. 8, related to FIG. 4, illustrates an exemplary detailed message flow for updating a trusted list in an on-demand basis and using the updated trusted list when downloading an eSIM, according to some embodiments.

FIG. 8 provides a message flow 800, which is a more detailed version of the message flow 400 shown in FIG. 4. Messages shown in FIG. 4 which are shown again in FIG. 8 use the same reference numerals in both. For example, FIG. 4 illustrates a message 401 "Plan Identifier." Message 401 occurs also in FIG. 8. Some events of FIG. 4 are replaced with a number of messages in FIG. 8. For example, the substance of the FIG. 4 event 402 "Reserve and Bind eSIM," occurs in FIG. 8 with the events in messages 831, 851, 861, 832, 833, 834, 852, 853, and 854. In other words, FIG. 4 presents an overall message flow, and FIG. 8 presents an exemplary embodiment with additional details.

Time advances from top to bottom in FIG. 8; for simplicity, a time axis is not shown. The detailed message flow 800 commences with event 810 at the device 110, "810, Setup Cellular Data." End user 120, in some embodiments, taps an input field denoted something to the effect of "set up cellular data" on a display of the device 110. The device sends message 811 to get available carrier data plans from a data plan purchase server 810. The device receives message 812 with indications of the available plans based on the current location of the device. At 813, the end user 120 makes a plan selection. A plan identifier is sent in message 401 to a web site provided by the selected carrier on a carrier server 130. The end user 120 is then presented with a web site display of the web site. The end user 120 purchases the plan directly through the carrier web site. The carrier, in some embodiments, accepts payment directly from the end user 120.

Figure 9:
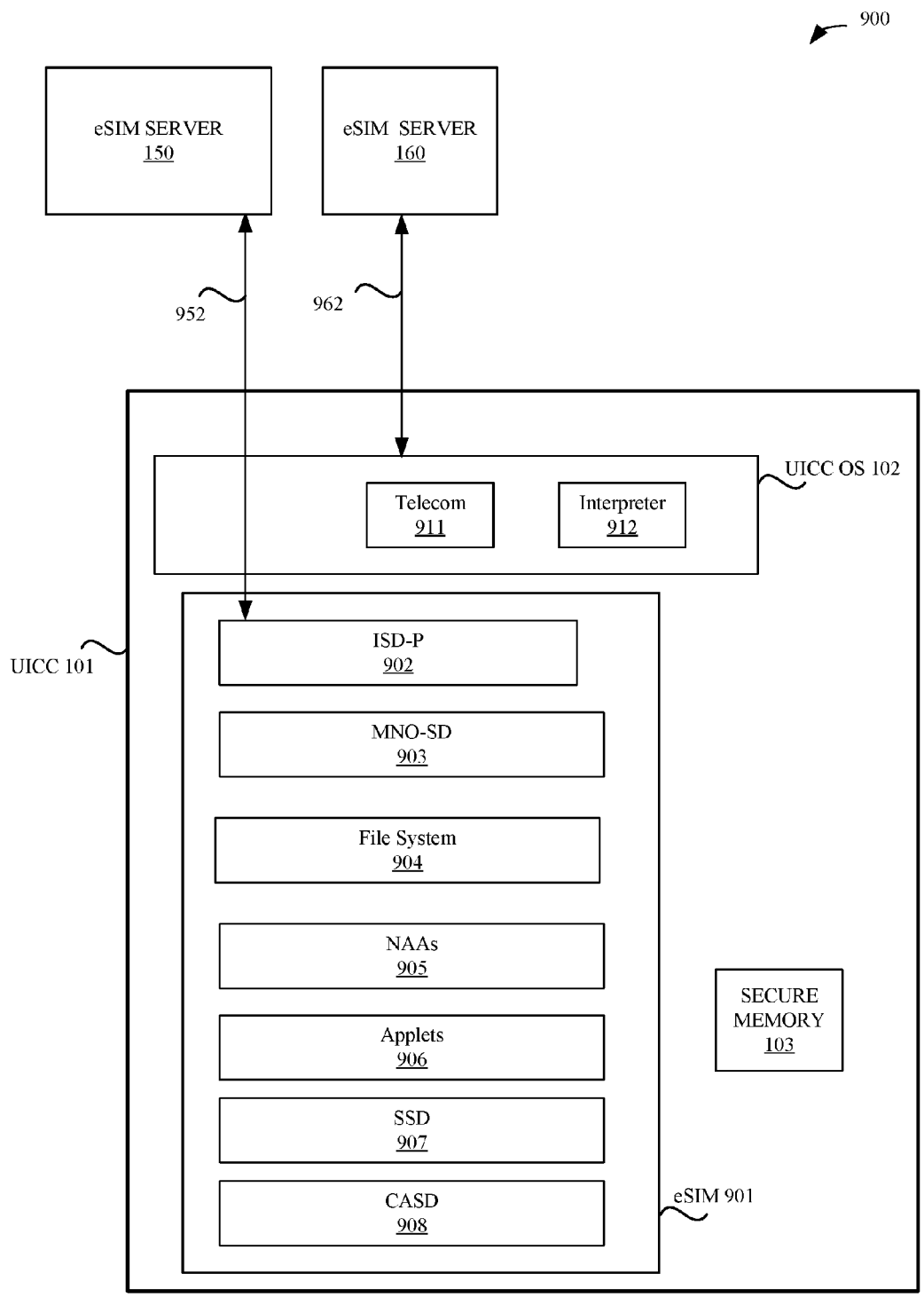
FIG. 9 illustrates exemplary details of a UICC in communication with servers and with an eSIM installed, according to some embodiments.

The carrier server 130 sends a message 831 requesting an eSIM, corresponding to the plan, to the eSIM server 150. The eSIM server 150, in some embodiments, is a host eSIM server hosted by a manufacturer of the device 110. The eSIM server 150 determines that the requested eSIM is not provided by the eSIM server 150, but is provided by the eSIM server 160. The eSIM server 150 forwards the eSIM request as message 851 to the eSIM server 160. The eSIM server 160 reserves an eSIM and sends message 861 including an identifier of the eSIM, e.g., an ICCID value identifying eSIM 901 (FIG. 9 illustrates some features of the eSIM 901 on the UICC 101 after installation). The eSIM server 150 forwards the eSIM 901 identifier to the carrier server 130 in message 832.

At event 833, the carrier server 130 activates service for the device 110 with the eSIM 901 on carrier billing systems. Message 834 is a bind eSIM command to the eSIM server 150, which is forwarded to the eSIM server 160 in message 852. The bind command confirms the UICC and eSIM pairing. The eSIM server 160 binds the eSIM 901 to the UICC 101 to create a BPP. The BPP then rests at the eSIM server 160 until such time as device 110 seeks to download the BPP.

The eSIM server 150 then checks whether the UICC 101 trusts the eSIM server 160. If not, event 853 is registered by the eSIM server 150 indicating that a policy update of the UICC 101 should occur. Message 854 indicates to the carrier server 130 that the eSIM 901 is bound to the UICC 101. The carrier server 130 then sends a plan confirmation message 403 to the device 110. The device 110 then registers a state indicating that an eSIM should be downloaded. This state is shown as event 814 "Trigger eSIM Download" in FIG. 8.

Based on the event 814, which is indirectly responsive to the end user 120 event 810 "Setup Cellular Data," the device 110 sends policy inquiry 404 to the eSIM server 150 asking for any policy updates. The eSIM server 150 has registered the event 853, and so sends a policy update 405. Message 405 may be referred to as a push of policies down to the device. Device 110 forwards the policy update as message 815 to a policy control function (PCF) of the UICC 101. The UICC 101 then updates the trusted list 301 and sends a message 801 to the device 110 indicating that the trusted list of server names (FIG. 3, reference numeral 301) has been updated.

Continuing with the sequence initiated by the event 814 "Trigger eSIM Download," the device 110 sends a message 816 to the eSIM server 150 to obtain one or more pending eSIMs. The eSIM server 150 sends message 855 redirecting the device 110 to the eSIM server 160. The device 110 then sends message 817 ("Trust Inquiry") to the UICC 101 to confirm that the eSIM server 160 is trusted by the UICC 101. Based on the updated trusted list 301, the UICC 101 sends positive confirmation message 802, "Trust Confirmation."

In response to message 406, the eSIM server 160 begins the download process of the BPP containing eSIM 901 to the device 110 (and ultimately the UICC 101). 818 indicates installation of the eSIM 901 on the UICC 101. 818 is a schematic figure indication, there are a number of events related to eSIM installation. For more details about installation of an eSIM, see SGP.22. After installation of the eSIM 901, the UICC 101 confirms the installation with the message 803.

At event 813, end user 120 commences to use their device 110 based on authentication, encryption, and application services and functions provided in their data plan as supported by the eSIM 901 downloaded from the eSIM server 160. The end user 120 has selected a carrier data plan in a user-friendly manner from a carrier of their choice. Download of the eSIM 901 has been enabled by an on-demand update of the trusted list in the UICC 101 to establish trust in the carrier's selected eSIM server, the eSIM server 160. The device 110 now functions just as if a traditional physical SIM card had been installed after selection of a carrier.

SE Details

FIG. 9 illustrates a system 900 with details of the UICC 101 including the eSIM 901. The eSIM 901 is installed in the UICC 101 of the device 110 as indicated in FIG. 2 at 203, FIG. 4 at 409, FIG. 6 at 606, FIG. 7 at 706, and FIG. 8 at 818. The UICC 101 includes the operating system 102. Within the operating system 102 is a telecom framework 911 which provides authentication algorithms to network access applications (such as NAAs 905). Interpreter 912 translates profile package data into an installed profile using a specific internal format of the UICC 101. ISD-P 902 hosts a profile, i.e., eSIM 901. The ISD-P is a secure container (security domain) for the hosting of the eSIM 901. The ISD-P is used for eSIM download and installation in collaboration with the interpreter 912 for the decoding of a received BPP. An issuer security domain (not shown) on the UICC 101 is responsible for the creation of new ISD-Ps on the UICC 101 and the lifecycle management of all ISD-Ps on the UICC 101. Secure memory 103, which can be an ECASD, provides secure storage of credentials required to support the security domains on UICC 101. MNO-SD 903 is the representative on the UICC 101 of the operator providing services via the eSIM 901 to the end user 120. The MNO-SD 903 contains the operator's OTA keys and provides a secure OTA channel. Further description of profile (eSIM) management can be found in SGP.22.

Example Device Connections

Figure 10:
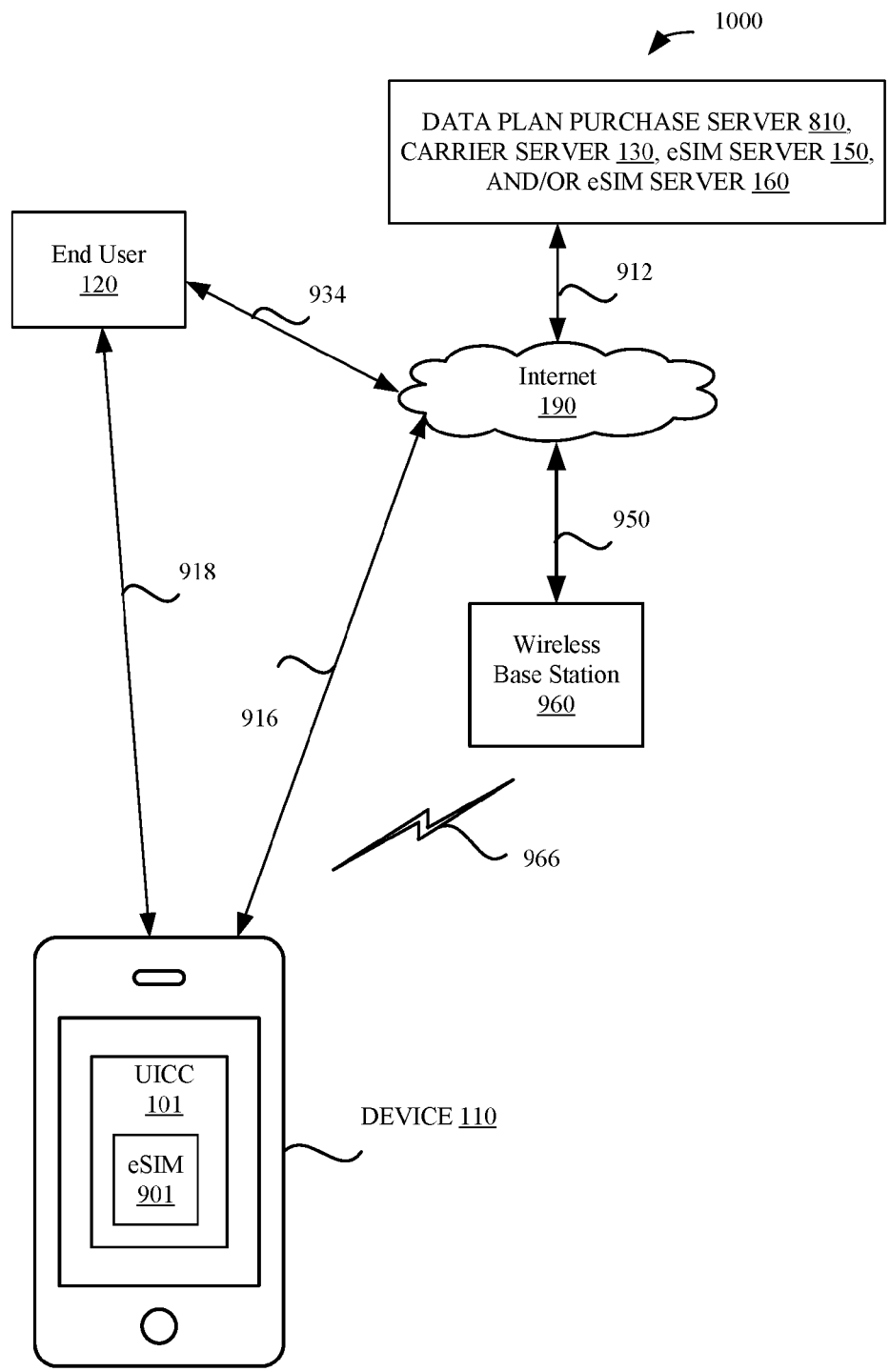
FIG. 10 illustrates the device with a UICC and with an eSIM installed in communication with an end user, and in communication via a wireless base station and/or the internet with various entities such as servers, according to some embodiments.

FIG. 10 illustrates example connection methods for on-demand update of a trusted list in a UICC in a system 1000. End user 120 can manage device 110 using interface 918 which can convey end user actions such as requesting a new carrier plan as described with respect to FIGS. 2, 4, 5, and 8, for example. The end user 120 can also remotely manage device 110 via the Internet 190 using interface 934. The device 110 is shown connected to a wireless base station 960. The wireless base station 960 communicates with the device 110 via a wireless link 966. The wireless base station 960 can be an Institute of Electronic and Electrical Engineers 802.11 Wireless Fidelity (IEEE 802.11 Wi-Fi) access point (AP) or the wireless base station 960 can be, for example, a cellular mobile network base station. Examples of cellular mobile network base stations are a 2G or 3G base station or an LTE eNode B.

A data blob with the eSIM 901 in encrypted form, in some embodiments, is downloaded from the eSIM server 160 to the device 110. The UICC 101 accepts the data blob based on finding an identity of the eSIM server 160 on the updated trusted list 301. After deployment of the eSIM 901, the end user 120 can now enjoy their requested carrier data plan or wireless service using the eSIM 901.

Variety of Radio Access Technologies

Wireless devices, and mobile devices in particular, can incorporate multiple different radio access technologies (RATs) to provide connections through different wireless networks that offer different services and/or capabilities. A wireless device can include hardware and software to support a wireless personal area network ("WPAN") according to a WPAN communication protocol, such as those standardized by the Bluetooth® special interest group ("SIG") and/or those developed by Apple referred to as an Apple Wireless Direct Link (AWDL). The wireless device can discover compatible peripheral wireless devices and can establish connections to these peripheral wireless devices located in order to provide specific communication services through a WPAN. In some situations, the wireless device can act as a communications hub that provides access to a wireless local area network ("WLAN") and/or to a wireless wide area network ("WWAN") to a wide variety of services that can be supported by various applications executing on the wireless device. Thus, communication capability for an accessory wireless device, e.g., without and/or not configured for WWAN communication, can be extended using a local WPAN (or WLAN) connection to a companion wireless device that provides a WWAN connection. Alternatively, the accessory wireless device can also include wireless circuitry for a WLAN connection and can originate and/or terminate connections via a WLAN connection. Whether to use a direct connection or a relayed connection can depend on performance characteristics of one or more links of an active communication session between the accessory wireless device and a remote device. Fewer links (or hops) can provide for lower latency, and thus a direct connection can be preferred; however, unlike a legacy circuit-switched connection that provides a dedicated link, the direct connection via a WLAN can share bandwidth with other wireless devices on the same WLAN and/or with the backhaul connection from the access point that manages the WLAN. When performance on the local WLAN connection link and/or on the backhaul connection degrades, a relayed connection via a companion wireless device can be preferred. By monitoring performance of an active communication session and availability and capabilities of associated wireless devices (such as proximity to a companion wireless device), an accessory wireless device can request transfer of an active communication session between a direction connection and a relayed connection or vice versa.

In accordance with various embodiments described herein, the terms "wireless communication device," "wireless device," "mobile device," "mobile station," "wireless station", "wireless access point", "station", "access point" and "user equipment" (UE) may be used herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless device, in some embodiments, can also operate as part of a wireless communication system, which can include a set of client devices, which can also be referred to as stations, client wireless devices, or client wireless devices, interconnected to an access point (AP), e.g., as part of a WLAN, and/or to each other, e.g., as part of a WPAN and/or an "ad hoc" wireless network, such as a Wi-Fi direct connection. In some embodiments, the client device can be any wireless device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax; or other present or future developed IEEE 802.11 technologies.

Additionally, it should be understood that the wireless devices described herein may be configured as multi-mode wireless communication devices that are also capable of communicating via different third generation (3G) and/or second generation (2G) RATs. In these scenarios, a multi-mode wireless device or UE can be configured to prefer attachment to LTE networks offering faster data rate throughput, as compared to other 3G legacy networks offering lower data rate throughputs. For instance, in some implementations, a multi-mode wireless device or UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

Representative Exemplary Apparatus

Figure 11:
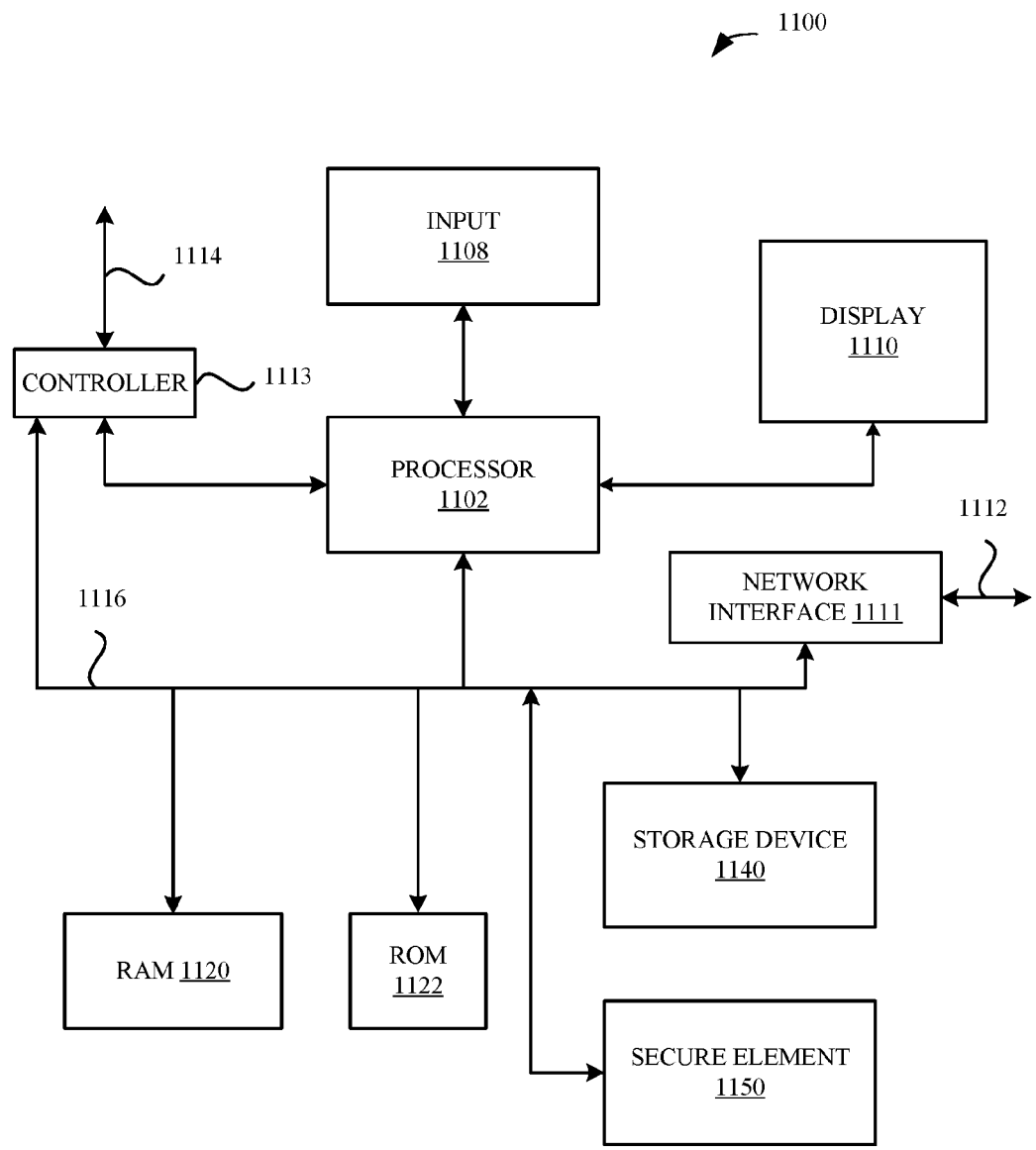
FIG. 11 illustrates an exemplary apparatus for implementation of the embodiments disclosed herein, according to some embodiments.

FIG. 11 illustrates in block diagram format an exemplary computing device 1100 that can be used to implement the various components and techniques described herein, according to some embodiments. In particular, the detailed view of the exemplary computing device 1100 illustrates various components that can be included in the eSIM server 150, the device 110, or the UICC 101 of FIG. 1, 2, 9, or 10. As shown in FIG. 11, the computing device 1100 can include a processor 1102 that represents a microprocessor or controller for controlling the overall operation of computing device 1100. In some embodiments, the computing device 1100 can also include a user input device 1108 that allows a user of the computing device 1100 to interact with the computing device 1100. For example, in some embodiments, the user input device 1108 can take a variety of forms, such as a button, keypad, dial, touch screen, audio input interface, visual/image capture input interface, input in the form of sensor data, etc. In some embodiments, the computing device 1100 can include a display 1110 (screen display) that can be controlled by the processor 1102 to display information to the user (for example, information relating to incoming, outgoing, or active communication session). A data bus 1116 can facilitate data transfer between at least a storage device 1140, the processor 1102, and a controller 1113. The controller 1113 can be used to interface with and control different equipment through an equipment control bus 1114. The computing device 1100 can also include a network/bus interface 1111 that couples to a data link 1112. In the case of a wireless connection, the network/bus interface 1111 can include wireless circuitry, such as a wireless transceiver and/or baseband processor. The computing device 1100 can also include a secure element 1150. The secure element 1150 can include a eUICC or UICC.

The computing device 1100 also includes a storage device 1140, which can comprise a single storage or a plurality of storages (e.g., hard drives), and includes a storage management module that manages one or more partitions within the storage device 1140. In some embodiments, storage device 1140 can include flash memory, semiconductor (solid state) memory or the like. The computing device 1100 can also include a Random Access Memory ("RAM") 1120 and a Read-Only Memory ("ROM") 1122. The ROM 1122 can store programs, utilities or processes to be executed in a non-volatile manner. The RAM 1120 can provide volatile data storage, and stores instructions related to the operation of the computing device 1100.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard storage drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method comprising:
by a first electronic subscriber identity module (eSIM) server:
receiving, from a carrier server, a first request for an eSIM of a first type;
when the first eSIM server hosts eSIMs of the first type, initiating an eSIM installation process with a device; and
when the first eSIM server does not host eSIMs of the first type:
sending, to a second eSIM server, a second request to reserve the eSIM on behalf of the device,
receiving, from the second eSIM server, a first identifier of the eSIM, and
sending, to the carrier server, the first identifier.

2. The method of claim 1, wherein the first eSIM server is a certificate authority (CA).

3. The method of claim 1, further comprising:
when the first eSIM server does not host eSIMs of the first type:
receiving, from the carrier server, a bind command message, wherein the bind command message confirms a pairing of the eSIM with a universal integrated circuit card (UICC), and wherein the UICC is present in the device; and
forwarding, to the second eSIM server, the bind command message.

4. The method of claim 3, wherein the UICC is an embedded UICC (eUICC).

5. The method of claim 3, further comprising:
when the first eSIM server does not host eSIMs of the first type:
determining that a policy update should occur because the UICC might not trust the second eSIM server.

6. The method of claim 5, further comprising:
when the first eSIM server does not host eSIMs of the first type:
sending, to the carrier server, a first message indicating the eSIM is bound to the UICC.

7. The method of claim 6, further comprising:
when the first eSIM server does not host eSIMs of the first type:
receiving, from the device, a policy inquiry; and
sending, to the device, a policy update message.

8. The method of claim 7, wherein the policy update message includes a common name of the second eSIM server.

9. The method of claim 7, wherein the policy update message includes a list of trusted servers.

10. The method of claim 7, further comprising:
when the first eSIM server does not host eSIMs of the first type:
receiving, from the device, a third request for a pending eSIM; and
sending, to the device, a redirection message, wherein the redirection message indicates the second eSIM server.

11. The method of claim 10, wherein the third request includes an integrated circuit card identifier (ICCID) or an embedded UICC identifier (EID).

12. An electronic subscriber identity module (eSIM) server comprising:
a memory; and
one or more processors, wherein the memory includes instructions that when executed by a processor of the one or more processors cause the eSIM server to perform operations comprising:
receiving, from a carrier server, a first request for an eSIM of a first type;
when the eSIM server hosts eSIMs of the first type, initiating an eSIM installation process with a device; and
when the eSIM server does not host eSIMs of the first type:
sending, to a second eSIM server, a second request to reserve the eSIM on behalf of the device,
receiving, from the second eSIM server, a first identifier of the eSIM, and
sending, to the carrier server, the first identifier.

13. The eSIM server of claim 12, wherein the eSIM server is a certificate authority (CA).

14. The eSIM server of claim 12, wherein the operations further comprise:
when the eSIM server does not host eSIMs of the first type:
receiving, from the carrier server, a bind command message, wherein the bind command message confirms a pairing of the eSIM with a universal integrated circuit card (UICC), and wherein the UICC is present in the device; and
forwarding, to the second eSIM server, the bind command message.

15. The eSIM server of claim 14, further comprising:
when the eSIM server does not host eSIMs of the first type:
determining that a policy update should occur because the UICC might not trust the second eSIM server.

16. The eSIM server of claim 15, further comprising:
when the eSIM server does not host eSIMs of the first type:
sending, to the carrier server, a first message indicating the eSIM is bound to the UICC.

17. The eSIM server of claim 16, further comprising:
when the eSIM server does not host eSIMs of the first type:
receiving, from the device, a policy inquiry;
sending, to the device, a policy update message;
receiving, from the device, a third request for a pending eSIM; and
sending, to the device, a redirection message, wherein the redirection message indicates the second eSIM server.

18. A non-transitory computer readable medium comprising instructions that, when executed by a processor of an electronic subscriber identity module (eSIM) server, cause the eSIM server to perform operations comprising:
receiving, from a carrier server, a first request for an eSIM of a first type;
sending, to a second eSIM server, a second request to reserve the eSIM on behalf of a device;
receiving, from the second eSIM server, a first identifier of the eSIM;
sending, to the carrier server, the first identifier;
receiving, from the carrier server, a bind command message, wherein the bind command message confirms a pairing of the eSIM with a universal integrated circuit card (UICC), and wherein the UICC is present in the device; and
forwarding, to the second eSIM server, the bind command message.

19. The non-transitory computer readable medium of claim 18, wherein the operations further comprise:
determining that a policy update should occur because the UICC might not trust the second eSIM server.

20. The non-transitory computer readable medium of claim 19, wherein the operations further comprise:
receiving, from the device, a policy inquiry;
sending, to the device, a policy update message;
receiving, from the device, a third request for a pending eSIM; and
sending, to the device, a redirection message, wherein the redirection message indicates the second eSIM server.

* * * * *